United States Patent [19]
Larson

[11] 3,716,772
[45] Feb. 13, 1973

[54] TAPERED CURRENT LIMIT PROTECTION FOR D. C. MOTOR

[75] Inventor: Dale E. Larson, Milwaukee, Wis.
[73] Assignee: Allis-Chalmers Corporation, Milwaukee, Wis.
[22] Filed: Feb. 28, 1972
[21] Appl. No.: 229,889

[52] U.S. Cl.................................................318/332
[51] Int. Cl................................................H02p 5/16
[58] Field of Search..............................318/332, 345

[56] References Cited

UNITED STATES PATENTS

| | | | |
|---|---|---|---|
| 3,295,040 | 12/1966 | Schiemann | 318/332 |
| 3,582,746 | 6/1971 | Nye | 318/332 |
| 3,588,655 | 6/1971 | Egan | 318/345 |

Primary Examiner—Bernard A. Gilheany
Assistant Examiner—Thomas Langer
Attorney—Lee H. Kaiser et al.

[57] ABSTRACT

A tapered current limit control for a thyristor-powered direct current shunt motor lowers the current limit level in speed ranges wherein the current carrying ability of the motor is reduced. A variable transconductance analog multiplier is inserted between a speed/voltage regulator which derives the current reference and a current regulator which receives the modified current reference and controls the firing circuit for the thyristors, and a modifying circuit including an absolute value amplifier responsive to motor speed attenuates the gain of the analog multiplier when motor speed exceeds predetermined magnitudes in both the forward and reverse directions of motor rotation.

11 Claims, 3 Drawing Figures

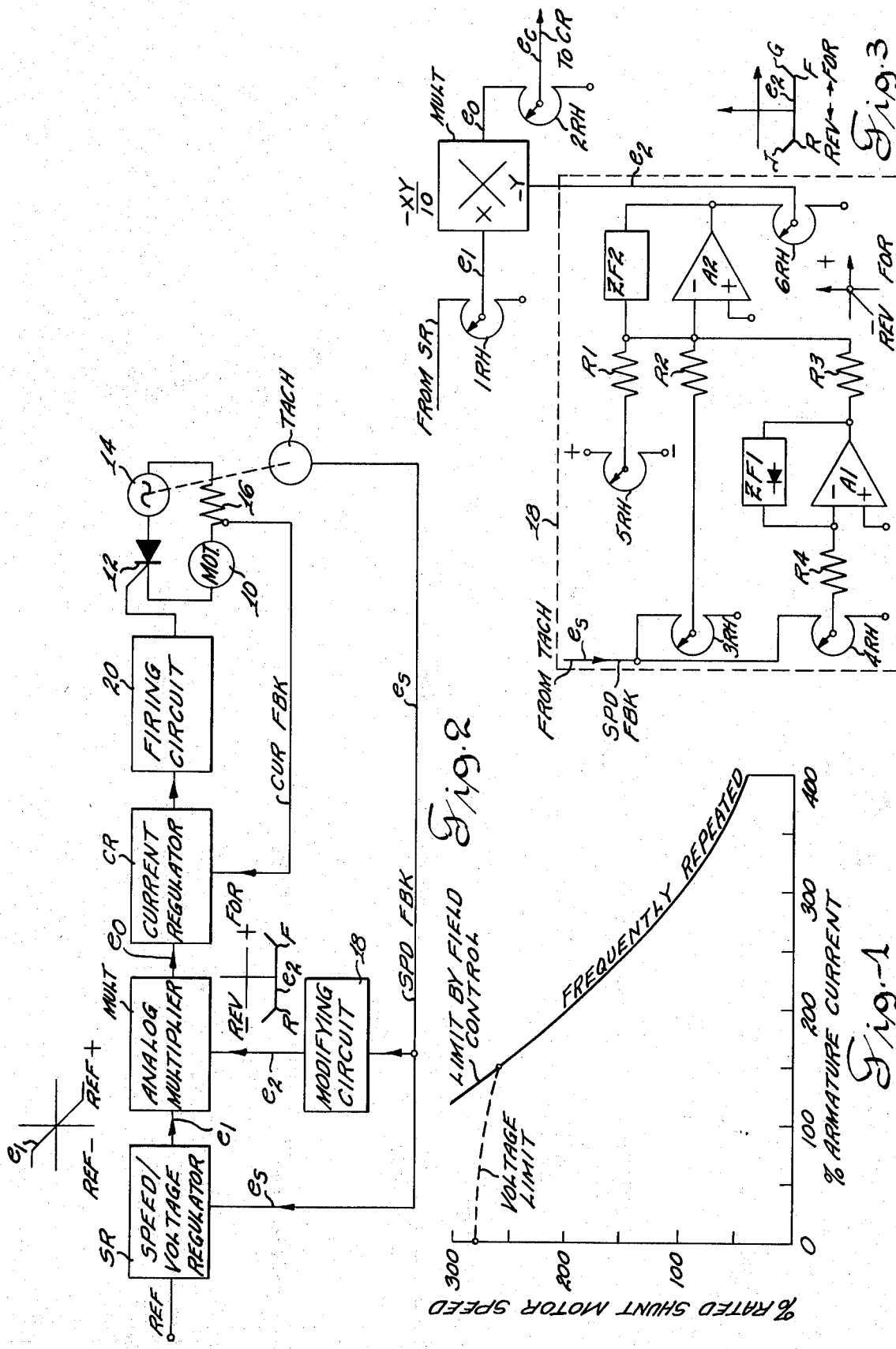

TAPERED CURRENT LIMIT PROTECTION FOR D. C. MOTOR

This invention relates to current limit protection for direct current motors.

BACKGROUND OF THE INVENTION

D. C. motor drives usually require a current limit control to protect the D. C. motor from overcurrent. Known current limit circuits regulate at the same value of current over the entire operating voltage/speed range of the motor. However, some applications require additional limiting control to protect a motor, for example, when the motor is operated above rated voltage or into the field weakening range. As motor speed rises, the speed of the commutator bars past the brushes increases. A tendency to flash the motor occurs under high speed conditions, and consequently the current carrying ability of the motor is limited by commutation problems at high speeds.

Motor control systems for thyristor-powdered D. C. motors usually include a speed/voltage regulator that feeds into a current regulator which is responsive to armature current flowing through the motor and controls the firing circuit for the thyristors that supply armature current to the motor. The speed/voltage regulator accepts a reference input signal and compares it with a speed feedback signal proportional to either motor speed or voltage, and the difference is amplified to produce a current reference to the current regulator stage. This current reference is compared with a current feedback signal proportional to drive armature current, and the error is amplified in the current regulator to produce a voltage which is fed to the phase control circuitry that determines the firing angle of the thyristors. As the phase angle is increased, the D. C. output voltage of the thyristor bridge increases and consequently the SCR's are phased forward in order to increase the D. C. armature current to the motor.

The gain of the speed/voltage regulator in such a conventional motor control system is linear over the normal speed/voltage range, and current limit is established when the speed/voltage regulator saturates so that the current reference signal (which it feeds to the current regulator) can no longer rise and, consequently, the motor armature current is limited. Such current limit circuit regulates at the same value of current over the entire operating voltage/speed range of the motor and cannot adequately protect a motor operated above rated voltage or into the field weakening range.

Prior art current limit controls are known using current feedback in a closed loop which employed both a nonlinear impedance responsive to motor speed plus zener diode spillover to taper the current limit as a function of motor speed. However, as the magnitude of current feedback varied, the response of the current regulator also changed. Such a current control loop must have extremely high gain to limit effectively, and this high gain resulted in stability problems. Further, although the spillover was instantaneous, the nonlinear element had a long time lag after a voltage proportional to motor speed was applied thereto with the result that the current limit tapering varied from the desired response when the motor was rapidly accelerated or decelerated. Further, the nonlinear impedance was not adjustable, and calibration of the current limit magnitude was difficult.

OBJECTS OF THE INVENTION

It is an object of the invention to provide a D. C. motor control system having improved current limit means which protects the motor in speed ranges wherein the current-carrying ability of the motor is reduced.

Another object of the invention is to provide improved tapered current limit protection for a D. C. motor which automatically reduces the current limit level to a safe value for the motor as its overcurrent capability is reduced.

Still another object of the invention is to provide improved tapered current limit protection for a D. C. motor which has effectively no time lag so that response is instantaneous and tapering is always in effect.

A further object of the invention is to provide improved tapered current limit protection for a D. C. motor which continuously regulates dynamically so that the stability problems encountered in prior art devices are avoided.

SUMMARY OF THE INVENTION

In accordance with the invention, the current limit for a thyristor-powered direct current shunt motor is lowered in speed ranges of reduced current-carrying ability by a variable transconductance analog multiplier connected between a speed/voltage regulator which derives the current reference and a current regulator which receives the modified current reference and controls the firing angles of the thyristors. A modifying circuit including an absolute value amplifier responsive to motor speed attenuates the gain of the analog multiplier when motor speed exceeds a predetermined magnitude.

DESCRIPTION OF THE DRAWINGS

These and other objects and advantages of the invention will be more readily understood from the following detailed description when considered in conjunction with the accompanying drawing wherein:

FIG. 1 is a speed-current graph showing the current carrying capability of a typical D. C. shunt motor to be protected by the invention;

FIG. 2 is a block diagram of a preferred embodiment of a motor control system in accordance with the invention; and FIG. 3 is a schematic circuit diagram of the tapered current limit portion of the motor control system of FIG. 2.

DETAILED DESCRIPTION

Referring to the drawing, FIG. 1 is a speed-current graph showing the current carrying ability of a type MD A.I.S.E. mill D. C. shunt motor plotting percent armature current as abscissae versus percent rated speed as ordinates. It will be noted that the motor is capable of carrying approximately 300 percent armature current at 100 percent rated speed and that it can carry 400 percent current only up to approximately 35 percent of base speed but that its current capability reduces to 200 percent of rated armature current at double voltage (speed).

FIG. 2 is a block diagram of a tapered current limit motor control system embodying the invention which protects a D. C. shunt motor having characteristics similar to those of FIG. 1 in such speed ranges wherein its current carrying ability is reduced. Motor armature 10 is connected in series with a suitable thyristor power supply, shown symbolically as a single SCR 12, and an alternating current source 14. One terminal of the alternating current source 14 is connected through a current sensor 16 (shown in the drawing as a resistance) to one terminal of the motor armature 10, and the other terminal of motor armature 10 is connected to the cathode of thyristor 12.

The speed reference signal for the motor control system may be derived from a manual rheostat or a digital computer or a process controller (none of which are shown) and is applied to input terminal REF of a speed/voltage regulator SR. The other input to speed/voltage regulator SR is a speed feedback voltage signal $e_s$ on a lead SPD FBK from a tachometer TACH operatively connected to motor armature 10. Speed/voltage regulator SR has a comparator stage (not shown) which preferably includes a summing operational amplifier that compares the speed feedback signal $e_s$ on conductor SPU FBK with the reference signal in input REF and amplifies the difference "speed error" signal when the two signals on leads SPD FBK and REF do not cancel. The output of the speed/voltage regulator SR varies linearly in both the positive and negative directions until it reaches a point of saturation as shown by the curve adjacent the output from the block and is the current reference signal $e_1$ which is applied directly to the current regulator of known motor control systems. When speed regulator SR saturates (or is limited), current limit is developed since the output voltage is the maximum current reference signal that can be applied to current regulator CR.

In accordance with the invention the current reference signal $e_1$ from speed/voltage regulator SR is one input to a variable transconductance analog multiplier MULT which preferably has the transfer equation $-xy,/10$ where the $x$ input is the current reference signal $e_1$ from speed regulator SR and the $y$ input is the output voltage signal $e_2$ from a modifying circuit 18 which receives the speed feedback signal $e_s$ from a tachometer TACH as an input. Analog multiplier MULT may be a differential input multiplier/divider such as the type sold by Burr-Brown Research Corporation having the transfer equation:

$$e_o = (x_1 - x_2)(y_1 - y_2)/10$$

connected in the multiply mode and provides a D.C. output voltage $e_o$ proportional to the algebraic products of the $x$ (current reference $e_1$) and $y$ ($e_2$ from modifying circuit 18) inputs.

When speed/voltage regulator SR reaches its output limit due to saturation or zener spillover type limiting, the current reference signal $e_1$ is a maximum and automatically establishes current limit. In order to generate a "tapered current limit" which approximates the current capability curve of FIG. 1, the "current reference" signal $e_1$ (and hence armature current) is dynamically modified by analog multiplier MULT as motor speed increases.

Modifying circuit 18 receives the speed feedback signal $e_s$ on lead SPD FBK as an input and derives an output signal $e_2$ which varies with speed in accordance with the U-shaped curve shown adjacent the output from the block so that the output signal $e_2$ is constant over a predetermined portion of the speed range and is attenuated, preferably linearly, at given motor speeds above 100 percent rated speed as described hereinafter.

Multiplier MULT preforms the multiplication function $(-xy/10)$ and, in effect, superimposes the current reference signal $e_1$ from speed/voltage regulator SR and the U-shaped output characteristics $e_2$ from modifying circuit 18 having two break points F and R therein. Inasmuch as the output of modifying circuit 18 is constant between the two breakpoints, multiplier MULT operates at unity gain with respect to the speed error signal $e_1$ over the speed/voltage range between the two break points F and R.

FIG. 1 shows that the motor may be operated at 300 percent of armature current at 100 percent rated (or base) speed and that at double rated speed the armature current should be reduced (tapered) to 150 percent. It will thus be seen that the forward and reverse break points F and R on the output versus speed characteristic from modifying circuit 18 should occur at 100 percent speed so that modifying circuit 18 reduces, or attenuates, its output beyond 100 percent speed. The gain of multiplier MULT is thus unity between the forward and reverse speed break points F and R and droops to a value less than unity beyond them. The multiplier MULT superimposes the output $e_2$ from modifying circuit 18 upon the current reference signal $e_1$ from speed/voltage regulator SR and generates a modified current reference $e_o$ which varies with speed in accordance with the characteristic shown adjacent the output from the modifying circuit block.

The modified current reference $e_o$ from analog multiplier MULT is one input to a current regulator CR which receives on its other input a "current feedback" voltage signal on a lead CUR FBK developed across current sensor 16 by the motor armature current flowing therethrough. Current regulator CR has a comparator stage which preferably is a summing operational amplifier (not shown), and when the modified current reference $e_o$ and current feedback signals do not cancel, the difference is amplified by current regulator CR and its output controls a firing circuit 20 to change the firing phase angle of SCR 12, thereby causing motor armature current to change until the difference between signals $e_o$ and CUR FBK is zero. Thus the motor armature current is made to match the current indicated by speed/voltage regulator SR as dynamically modified by multiplier MULT.

FIG. 3 illustrates in greater detail the "tapered current limit" portion of the motor control system including modifying circuit 18 and multiplier MULT. The speed regulator output signal $e_1$ may be adjusted by a rheostat IRH to the proper level for multiplier MULT, typically 10 volts. The output signal $e_o$ from multiplier MULT is attenuated by a rheostat 2RH to a modified current reference level $e_c$ input to current regulator CR which established armature current at the desired current limit magnitude, i.e., 300 percent of rated current, when speed regulator SR is saturated and the output $e_2$ from modifying circuit 18 is a maximum. In other words, rheostat 2RH sets the initial current limit before tapering begins.

If the D. C. drive is reversing in direction, the current reference signal $e_1$ from speed regulator SR and the modified current reference signal $e_o$ from multiplier MULT must also reverse. However, the output signal $e_2$ from modifying circuit 18 must not reverse in order to maintain the proper polarity of the current reference signals $e_1$ and $e_o$, and modifying circuit 18 includes two operational amplifiers A1 and A2 which together comprise an absolute value amplifier whose output is always of the same polarity regardless of the polarity of the input signal thereto.

Amplifier A2 is a summing amplifier and receives a signal on its inverting input through a resistance R1 from the slider of a rheostat 5RH having its ends connected across the + and − terminals of a suitable D. C. power supply. The slider of rheostat 5RH is initially adjusted to apply a positive signal through resistance R1 to the inverting input of amplifier A2 so that amplifier A2 is in negative saturation and provides a constant output shown by the horizontal portion of the U-shaped speed output characteristic $e_2$ shown adjacent the modifying circuit block in FIG. 2 and adjacent rheostat 6RH in FIG. 3. The output of amplifier A2 is attenuated by a rheostat 6RH whose slider derives the output $e_2$ from modifying circuit 18, and rheostat 6RH is adjusted so that $e_2$ is the proper value (typically −10 volts) for input to multiplier MULT when amplifier A2 is saturated. Under such conditions the gain of analog multiplier MULT will be unity and the current reference $e_o$ output from the multiplier MULT will be directly proportional to the input $e_1$ derived from rheostat IRH.

The speed feedback signal $e_s$ from tachometer TACH is coupled through a rheostat 3RH and a resistance R2 in series to the inverting input of summing amplifier A2. When motor armature 10 is rotating forward, the speed feedback signal $e_s$ is negative, and is coupled through rheostat 3RH and resistance R2 to the inverting input of amplifier A2 and tends to cancel the positive bias signal from rheostat 5RH. Rheostats 5RH and 3RH determine when taper begins, i.e., the forward break point F, and rheostats 5RH and 3RH are adjusted so that summing amplifier A2 comes out of saturation at 100 percent rated speed. Above 100 percent rated speed the negative speed feedback signal $e_s$ applied to the inverting input of amplifier A2 will be amplified and cause the output of amplifier A2 to become more positive to thus generate the tapered portion FG of the speed-output characteristics $e_2$ which slopes upwardly at a positive angle from forward break point F. The speed feedback signal $e_s$ is attenuated by rheostat 3RH which defines the slope of the tapered portion FG.

The output of amplifier A1 is coupled to the inverting input of summing amplifier A2 through a resistor R3 whose resistance is preferably one-half the value of resistor R1 or R2. The speed feedback signal $e_s$ is coupled through a rheostat 4RH and a resistance R4 to the inverting input of amplifier A1. The feedback impedance circuit $z_{F1}$ of amplifier A1 includes diode means (not shown) which blocks one polarity of signal and prevents amplifier A1 from responding to negative values of speed feedback signal $e_s$. In other words, amplifier A1 is directional and only amplifies the positive signals $e_s$ generated by tachometer TACH when the motor is rotating in the reverse direction. The positive polarity signals $e_s$ are inverted by amplifier A1, and the output from amplifier A1 increases in a negative direction with speed when the motor is rotating in the reverse direction as shown in the straight line characteristic adjacent the output of amplifier A1. Amplifier A2 remains in saturation during reverse rotation of the motor from zero speed until 100 percent rated speed is attained, at which point the negative output from amplifier A1 cancels the positive bias from rheostat 5RH and the speed signal from 3RH sufficiently so that amplifier A2 comes out of saturation, thereby defining the reverse break point R of the $e_2$-speed characteristic. At reverse motor speeds above 100 percent rated speed, the negative output signals from amplifier A1 are amplified by summing amplifier A2 to form the tapered portion RJ of the $e_2$-speed curve which slopes upwardly at a negative angle. Rheostat 4RH sets the gain through amplifier A1 for the reverse speed signal and together with rheostats 3RH and 5RH determine the break point R for reverse motor rotation.

If closer approximation of the nonlinear shape the curve of FIG. 1 is required, suitable nonlinear elements (not shown) may be inserted in the $Z_{F2}$ feedback impedance circuit of amplifier A2 to provide the desired shaping of the $e_2$-speed characteristic.

Analog amplifier MULT has no appreciable time lag, and consequently, tapering of current limit is always in effect even during rapid acceleration and deceleration of the motor. The forward and reverse break points are easily adjusted by rheostats 3RH, 4RH and 5RH. Further, inasmuch as the tapering is accomplished in the forward minor current loop by modification of the current reference $e_1$, the tapering cannot be overridden. Further, inasmuch as the current reference $e_1$ is modified by the speed feedback signal $e_s$ to accomplish tapered current limit, the current regulator CR need not have high gain as was required by known current limit devices using nonlinear elements and zener spillover devices to accomplish tapered current limit, thus avoiding the instability and time delay problems encountered in prior art devices.

It should be understood that I do not intend to be limited to the particular embodiment shown and described for many modifications and variations thereof will be readily apparent to those skilled in the art.

The embodiments of the invention in which an exclusive property or privilege is claimed are defined as follows:

1. In a control system for a direct current motor operative with a thyristor power supply, the combination of:
    a voltage reference regulator having a maximum output,
    a current regulator,
    thyristor firing circuit means operative with said thyristor power supply and coupled to the output of said current regulator,
    an analog multiplier between the output of said voltage reference regulator and the input of said current regulator, and means coupled to said analog multiplier and responsive to the speed of said motor for attenuating the gain of said analog multiplier when the speed of said motor exceeds a predetermined magnitude.

2. In a control system in accordance with claim 1 wherein the current carrying ability of said direct current motor tapers off with increase in motor speed along a speed-current characteristic, and said gain attenuating means decreases the gain of said analog multiplier with increase in motor speed above said predetermined magnitude along a curve which approximates said speed-current characteristic.

3. In a control system in accordance with claim 1 including means for generating a speed feedback signal which is a function of the speed of said motor, and wherein said gain attenuating means includes an absolute value amplifier receiving said speed feedback signal as an input and whose gain is a function of the magnitude but independent of the polarity of said speed feedback signal.

4. In a control system in accordance with claim 3 wherein said absolute value amplifier includes a summing operational amplifier having said speed feedback signal coupled to the inverting input thereof, and means for applying a direct current bias signal to said inverting input to bias said summing amplifier into saturation, whereby the output of said summing amplifier is constant until said speed feedback signal cancels said bias signal sufficiently to bring said summing amplifier out of saturation.

5. In a control system in accordance with claim 4 wherein said absolute value amplifier includes a second operational amplifier having said feedback signal coupled to the inverting input thereof and having its output coupled to the inverting input of said summing amplifier, and means for preventing said second operational amplifier from responding to one polarity of said speed feedback signal.

6. In a control system for a direct current motor energized from a thyristor power supply regulated by gating signals from a firing circuit whose phase angles are a function of an input to said firing circuit,
feedback means for generating a speed feedback signal which is a function of the speed of said motor,
current feedback means for generating a current feedback signal which is a function of the armature current in said motor,
a reference signal source,
a speed regulator for comparing said reference and speed feedback signals and having a maximum output,
an analog multiplier receiving the output of said speed regulator on one input thereto,
a current regulator for comparing the output from said analog multiplier with said current feedback signal and for supplying a current error signal to said firing circuit which is a function of their difference, and
modifying circuit means receiving said speed feedback signal as an input for attenuating the gain of said analog amplifier when the speed of said motor exceeds a predetermined magnitude in the forward direction and also when it exceeds a predetermined magnitude in the reverse direction.

7. In a control system in accordance with claim 6 wherein said modifying circuit means includes an absolute value amplifier whose output is a function of the magnitude but independent of the polarity of the speed feedback signal input thereto.

8. In a control system in accordance with claim 7 wherein said absolute value amplifier includes a summing operational amplifier, means to couple said speed feedback signal to the inverting input of said summing amplifier, and means to apply a direct current bias signal to said inverting input to bias said summing amplifier into saturation when said motor is at standstill, whereby the output of said summing amplifier is constant until said speed feedback signal cancels said bias signal sufficiently to bring said summing amplifier out of saturation.

9. In a control system in accordance with claim 8 wherein said absolute value amplifier also includes a second operational amplifier having said speed feedback signal coupled to the inverting input thereof and having its output coupled to said inverting input of said summing amplifier, and means for preventing said second operational amplifier from responding to one polarity of said speed feedback signal.

10. In a control system in accordance with claim 9 wherein said direct current bias signal is of opposite polarity to said speed feedback signal when said motor is rotating in the forward direction and said one polarity of said speed feedback signal to which said second operational amplifier does not respond is generated when said motor is rotating in the forward direction.

11. In a control system in accordance with claim 6 wherein said modifying circuit means generates a substantially constant output signal when said speed feedback signal is below a predetermined first value when said motor is rotating forward and also when said speed feedback signal is below a second predetermined value when said motor is reversed, and wherein said modifying circuit generates an output signal lower than said constant output signal when said speed feedback signal is greater than said first predetermined value when said motor is rotating forward or is greater than said second predetermined value when said motor is reversed.

* * * * *